FIG. 4

United States Patent Office 3,324,045
Patented June 6, 1967

3,324,045
CATALYTIC COMPOSITION FOR CONVERSION
OF HYDROCARBON DISTILLATES
Harold F. Mason, Berkeley, Calif., assignor to Chevron Research Corporation, a corporation of Delaware
Filed Feb. 18, 1959, Ser. No. 794,109
21 Claims. (Cl. 252—439)

INTRODUCTION

This invention relates to the provision of a novel catalyst which is useful in processes for efficiently converting hydrocarbons and hydrocarbon fractions to those of lower molecular weight. More particularly, this invention is directed to the provision of a composite catalyst incorporating an active, siliceous cracking component and a nickel or cobalt-containing hydrogenating component, said catalyst being prepared by a novel method whereby there is obtained a catalyst having an activity which is far higher than that heretofore obtained with catalysts of the same general class.

OBJECTS

It is an object of this invention to provide a new catalyst which is especially effective in the conversion of hydrocarbon distillates to valuable motor, jet, and other fuel fractions, as well as to lighter iso paraffins and aromatics, said conversion being effected under such conditions that normally gaseous hydrocarbons and coke are formed in but extremely small amounts. Another object is to provide a catalyst of this character which exhibits extremely high activity even at low temperatures and pressures, conditions which minimize the rate of coke formation and thus greatly extend the useful life of the catalyst.

RESULTS OBTAINABLE WITH CATALYST OF PRESENT INVENTION

The present invention rests on discovery that the foregoing and other objects are attained with the provision of a novel catalyst composition formed by a critical heat treatment of a composite material incorporating an active siliceous cracking component along with a nickel and/or cobalt-containing hydrogenating component in the amounts hereinafter prescribed. It has been found that the new catalyst is especially effective in converting petroleum and other hydrocarbon fractions (such, for example, as those derived from shale, gilsonite or other natural sources) to lower boiling products in such manner that the product has an unusually high ratio of iso to normal paraffins, the catalyst also conserving a large proportion of any ring structures present in the feed as it is converted to a lower boiling product. This latter property is of great importance because of the high value placed on naphthenes and aromatics in many product applications. Moreover, these results are obtained with high per pass conversions and extremely small losses to coke and light gaseous products, at temperatures far lower than those which it has heretofore been possible to employ with conventional hydrocracking catalyst, and optionally at lower pressures, as well. In any event, the low temperature (and pressure) operation thus made possible makes for but very small losses of catalyst activity as the reaction progresses, and while it may be necessary to gradually raise operating temperatures during the course of any given run if conversion is to be maintained at a predetermined level, nevertheless, by initiating the run at low average catalyst temperatures it is possible to extend the run length by a factor of many times over that obtained heretofore before reaching temperatures where replacement or regeneration of the catalyst is indicated.

GENERAL CHARACTERISTICS OF CATALYST

The catalyst of this invention, as noted above, is comprised of a siliceous component having high activity as a cracking catalyst, together with one or more components having activity as hydrogenation (i.e., hydrogenation-dehydrogenation) catalysts and selected from the group consisting of the oxides and sulfides of cobalt and nickel and the hydrogen-reduced counterparts of said oxides, nickel sulfide being preferred. When a nickel-containing member of said group is employed as the hydrogenating component of the catalyst, the finished catalyst should contain from about 0.5 to 25% by weight of nickel, while with cobalt, the range is from about 3 to 25%. The catalyst, as prepared under optimum heat treating conditions, has an activity index, as that term as hereinafter defined, of at least 18, and preferably of 20 or more. These values are at least 4 numbers higher than those of catalysts having the same empirical composition and prepared in the same fashion but without the terminal heat treatment necessarily practiced to form the catalyst of this invention, even when said treatment is not effected under optimum process conditions. As will be seen hereinafter, this is equivalent to an increase of at least 50% in activity as measured by hydrocarbon conversion at 550° F.

ACTIVITY CHARACTERISTICS OF CATALYST

The aforesaid difference in activity index levels is highly significant and establishes the heat-treated catalyst of the present invention as having characteristics so superior to those of the catalyst not so treated as to make for a difference amounting to one of kind between the respective materials. Thus, to take a typical operation wherein an essentially nitrogen-free naphtha boiling between about 360° and 450° F., as obtained from the cracking of petroleum fractions, is passed over the catalyst along with hydrogen gas under conventional processing conditions (e.g., 1 LHSV, 1200 p.s.i.g., and 6500 s.c.f. $H_2$ per barrel of feed), it is found that a catalyst of this invention having an activity index of 21 gives a per pass conversion of said feed to valuable fuel products boiling below 360° F. of 49% at an average catalyst temperature of 550° F., and this with essentially negligible losses to light gases and coke. The same catalyst as prepared by the methods of the prior art and having an activity index of 14 gives a per-pass conversion of but 20% under these same conditions. In terms of run length in an operation conducted under these conditions, but with average catalyst temperatures being gradually raised as required to maintain per-pass conversion at a 60% level, it is found that the catalyst having an activity index of 21 may be kept on stream for approximately 4100 hours before reaching a temperature of 700° F., while the catalyst of 14 activity index can be similarly employed for only 910 hours before reaching said temperature. The differences in conversion and run length are almost equally as striking when comparing the prior art catalyst of 14 activity index with one of the present invention having the minimal activity index of 18 set forth above. Thus, the latter catalyst gives a per-pass conversion of 37% at 550° F., and affords a run length of 2100 hours at 60% per-pass conversion before reaching 700° F.

CHARACTERISTICS OF SILICEOUS COMPONENT OF CATALYST

In referring herein to the cracking component of the catalyst, the term "active siliceous cracking component" is employed to designate any synthetic or natural siliceous composition of acid character which is effective for the cracking of hydrocarbons. This siliceous component, before deposition of the hydrogenation catalyst thereon, should contain at least about 40% by weight of silica, calculated as $SiO_2$. From the activity cracking standpoint, the siliceous component of the catalyst should be one having a "Cat. A" activity of at least 25 as measured by the method of J. Alexander and H. G. Shimp, National Petroleum News (1944), vol. 36, page R–537 and of J. Alexander, Proc. Am. Petroleum Institute (1947), vol. 27, page 51. As illustrative of the cracking catalyst components which can be used, synthetic silica-alumina, silica-magnesia, silica-zirconia and silica-alumina-zirconia catalysts give good results, as do natural cracking catalysts such as the bentonite and kaolin clays, it being recognized that in some cases the acidic nature of the cracking component of the catalyst may be enhanced by the addition of halides or the practice of other known means for developing Lewis or Bjronsted type of acidity in the finished catalyst composition. A preferred active siliceous cracking component for use in the catalyst of this invention is comprised of synthetically prepared composites of silica and alumina containing from about 70 to 99% of the silica component.

METHOD OF PREPARATION OF SILICEOUS CRACKING COMPONENT OF CATALYST

The method by which the catalyst of this invention is prepared involves a number of critical and interrelated factors having to do with the relative amount of the hydrogenation component employed, the temperature and time of the final heat treatment given the catalyst, and the make-up of the gas passed over the catalyst during said treatment as well as the rate of passage of said gas. However, the siliceous cracking component of the catalyst can be prepared by known methods. Similarly, the cobalt or nickel components can be deposited on or composited with the siliceous component and thereafter reduced to oxide form by methods heretofore disclosed in the art. Thus, the proposed class of silica-alumina cracking components can be prepared by any one of several alternate methods. For example, an aqueous solution of an aluminum salt, suitably adjusted in acidity, may be combined with a solution of sodium silicate under such conditions that the corresponding gels are coprecipitated in intimate admixture. On the other hand, silica-gel and alumina-gel may be separately prepared and then mixed in the desired proportions. Alternatively, a formed silica-gel may be treated with an aqueous solution of an aluminum salt, and the alumina precipitated in the silica-gel by the addition of a precipitant. In another method the silica-alumina may be prepared by first forming an acid-stabilized silica sol and then adding an adsorptive alumina to raise the pH and cause the gelation of the mixture.

IMPREGNATION OF SILICEOUS CRACKING COMPONENT OF CATALYST

After preparation of the siliceous cracking component, the latter is preferably impregnated with an aqueous solution of a water-soluble salt of cobalt or nickel, the concentration of the salt in this solution and the quantity of the latter used to impregnate the catalyst being such that the desired concentration of cobalt or nickel is established on the cracking support. Representative salts which may be employed to effect said impregnation are the chlorides, nitrates and acetates of nickel or cobalt, though other heat decomposable salts may be employed if desired, including various metallo-organic compositions such as the chelates. After impregnation, the catalyst is dried and then calcined at temperatures usually of the order of 900° to 1100° F. to convert the contained metal salt in the catalyst to the corresponding oxide. Instead of following the foregoing impregnation procedure, the cobalt and/or nickel salts can be incorporated in the siliceous catalyst component as the same is being formed, in which case the composition is also dried and calcined to form the metal oxides.

PHYSICAL SIZE AND SHAPE OF CATALYST

The catalyst can be used in the form of pellets, beads, extruded or other particle shapes, whether further comminuted or not. Thus, good results have been obtained with a catalyst mass made up of small beads having an average diameter of about ⅛", as well as with a crushed aggregate prepared from said beads. Good results are also obtained when the catalyst is ground to a fineness permitting of so-called "fluidized" operation.

HEAT TREATMENT OF CATALYST

In accordance with the method of this invention, it has been found that composite catalysts containing an active siliceous cracking component together with nickel, cobalt or the oxides or sulfides of said metals in hereinafter defined amounts, can be prepared in an unusually active form by the practice of a controlled heating step wherein the catalyst, with the cobalt or nickel present therein in the form of oxides or of compounds decomposed thereto on heating, is subjected to a so-called thermactivation step wherein a relatively dry, non-reducing gas such as air, nitrogen or $CO_2$ is passed through the mass of particulate catalyst undergoing treatment at a rate which is preferably at least 10 cu. ft. per hour, per cu. ft. of catalyst (10 VHSV), at temperatures falling in a range of from about 1200 to 1600° F., and at pressures which may be either essentially atmospheric, subatmospheric or superatmospheric. This treatment is continued for a period of time sufficient to induce a substantial increase in catalyst activity as measured by the ability of the catalyst to convert hydrocarbon feed fractions to produce fractions boiling below the initial boiling point of the feed. While such activity, as measured in terms of volume percent of feed converted in a single pass over the catalyst, will vary depending on feed composition, throughput rate and other operating factors, the relative increase in activity obtained by a practice of the present thermactivation treatment is one of at least 50% as measured at 550° F., with an essentially nitrogen-free hydrocarbon feed fraction boiling within a range of from about 330 to 650° F. In a broad sense this relative increase in catalyst activity can be obtained by the practice of heat treating periods ranging from about 10–30 minutes to 48 or more hours, it being noted that the longer times (e.g., 20 to 48 hours) are employed when treating the catalyst at temperatures in a range of from about 1200–1300° F. if the maximum benefits possible at said temperature are to be obtained, while periods of relatively short duration (e.g., 0.25 to 2 hours) are employed at temperatures approaching 1500° F. and above.

FACTORS AFFECTING CATALYST ACTIVITY

In general, other conditions remaining the same, the activity of the catalyst is increased by (1) raising the temperature of the air or other non-reducing gas which is passed through the catalyst; (2) extending the length of the heat treating period, it being noted that as temperatures significantly above 1400° F. are employed, catalyst activity reaches peak activity in a relatively short period of time and thereafter declines with continued heat treatment; (3) raising the relative content of the hydrogenating component present; (4) maintaining the partial pressure of water vapor in the gaseous stream passing through the catalyst at as low a level as possible; and (5) increasing the rate of flow of the heated gas through the catalyst mass undergoing treatment. The effect of these individual factors, all of which are inter-related and may be so integrated with one another as to ensure maximum catalyst activity, will now be separately examined.

EFFECT ON CATALYST ACTIVITY INDEX OF VARYING CATALYST HEAT TREATING TEMPERATURES

Figure 1:
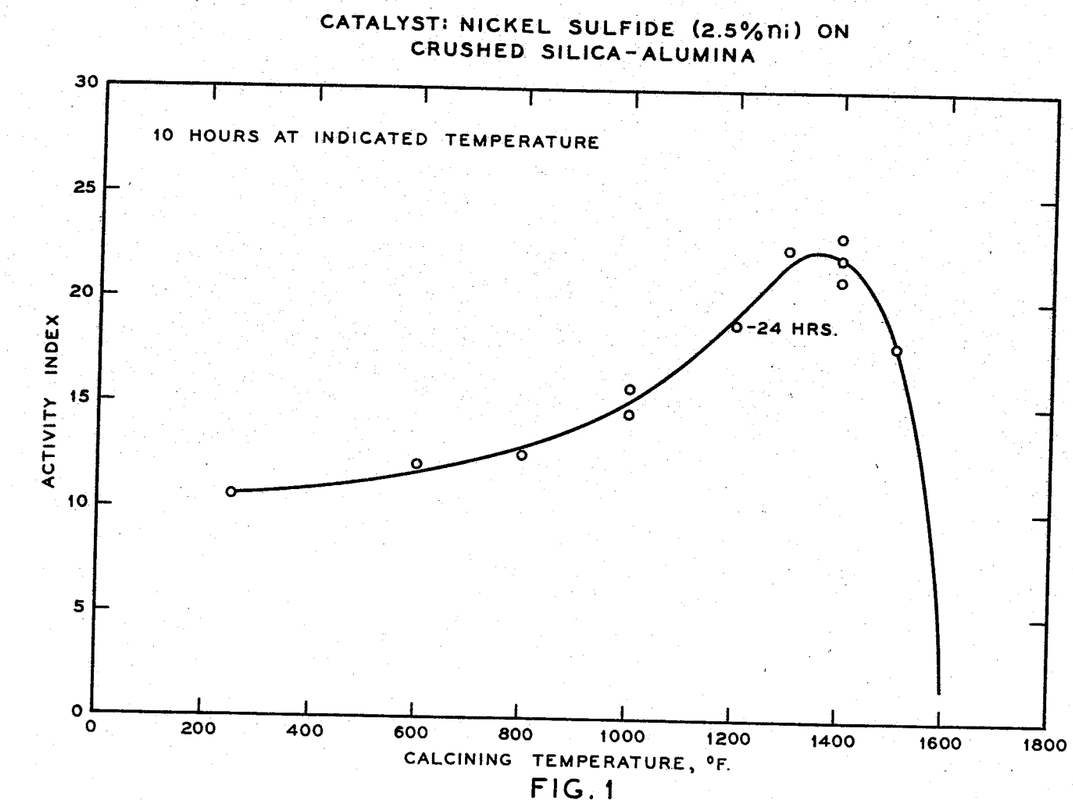

A. *Preparation of FIG. 1 catalyst support.*—The general effect of a change in treating temperatures on the activity index of the catalyst is shown by the data of the graph of FIG. 1 of the drawings wherein activity index is plotted against the temperature of the (dry) air passed over the catalyst at a rate of approximately 25 cu. ft./ hr./cu. ft. of catalyst for a period of 10 hours at each temperature point indicated except at 1200° F., where the heating period was 24 hours. In the several runs shown in this figure, the catalyst employed was a typical one made up of nickel sulfide (2.5 wt. percent Ni) supported on a synthetically prepared silica-alumina cracking catalyst of high activity (Cat. A value of 46) containing approximately 90% $SiO_2$ and 10% $Al_2O_3$. More specifically, the support was formed by crushing beads having a diameter of approximately ⅛″ to 8–14 mesh size, said beads having been manufactured by adding a solution of sodium silicate to one containing aluminum sulfate and sulfuric acid, with the hydrogel so formed being converted into beads by passage through an oil. The resultant beads were then base-exchanged with an aqueous solution of aluminum sulfate to increase the aluminum content (expressed as $Al_2O_3$) to approximately 10%, following which any sodium remaining in the beads was removed by base exchange using an aqueous solution of ammonium chloride. The alkali-free beads were slowly dried in a humid atmosphere and were then calcined at a temperature of about 1200° F. until the surface area of the product was reduced to approximately 430 $M^2$/gm. Unless otherwise stated, this material is that meant in hereinafter referring to silica-alumina beads whether the same be employed whole or crushed to 8–14 mesh size.

B. *Impregnation and drying of FIG. 1 catalyst support.*—The catalysts used in obtaining the data of FIG. 1 were prepared by impregnating the support described in the preceding paragraph with an aqueous solution of either nickel nitrate or nickel acetate in an amount sufficient to provide 2.5 wt. percent nickel on dried catalyst. The resulting impregnated product was thereafter dried for 10 hours at temperatures of about 250° F.

C. *Heat treating of FIG. 1 catalyst.*—Each sample of the dried catalyst so prepared (except the 250° F. control) was then heated for 10 hours at one or another of the temperatures shown, it being noted that all catalysts heated above 1000° F. were first calcined at said temperature for 10 hours before being treated for this same length of time at the indicated higher temperature. However, experience shows this pre-calcining step to be unnecessary from an activation standpoint, the metal salts being suitably converted to the oxide form during the initial stages of heating the catalyst to 1200° F. or above. Folowing the heating step, the nickel compound present on the catalyst was converted to nickel sulfide by passing over the catalyst an excess of a feed made up of mixed hexanes containing 10% by volume of dimethyl disulfide, this sulfiding treatment being effected at 1200 p.s.i.g. and at a temperature of 610° F., hydrogen also being present in the feed in the amount of about 8000 s.c.f. per barrel of feed.

D. *Effect of catalyst heat treating temperature on activity.*—Reference to FIG. 1 shows that catalyst activity reached a peak in the region of about 1300 to 1400° F. However, as will be seen from later-presented data, the 10-hour treating period employed in these tests was so long as to push the 1500° F. heat-treated catalyst through its peak activity and into a state of partial deactivation. On the other hand, it is believed that the catalyst treated at 1200° F. could have been further marginally improved in activity had the heat treatment been extended to 36 or 48 hours or more. Alternatively, better results with this as well as the other catalysts could have been obtained by increasing the rate at which air was passed over the catalyst. The catalysts shown as having been calcined for 10 hours at 1000° F. are representative of those prepared by the method of the prior art.

PREVENTION OF CATALYST DEACTIVATION FROM HEAT TREATING

Figure 2:
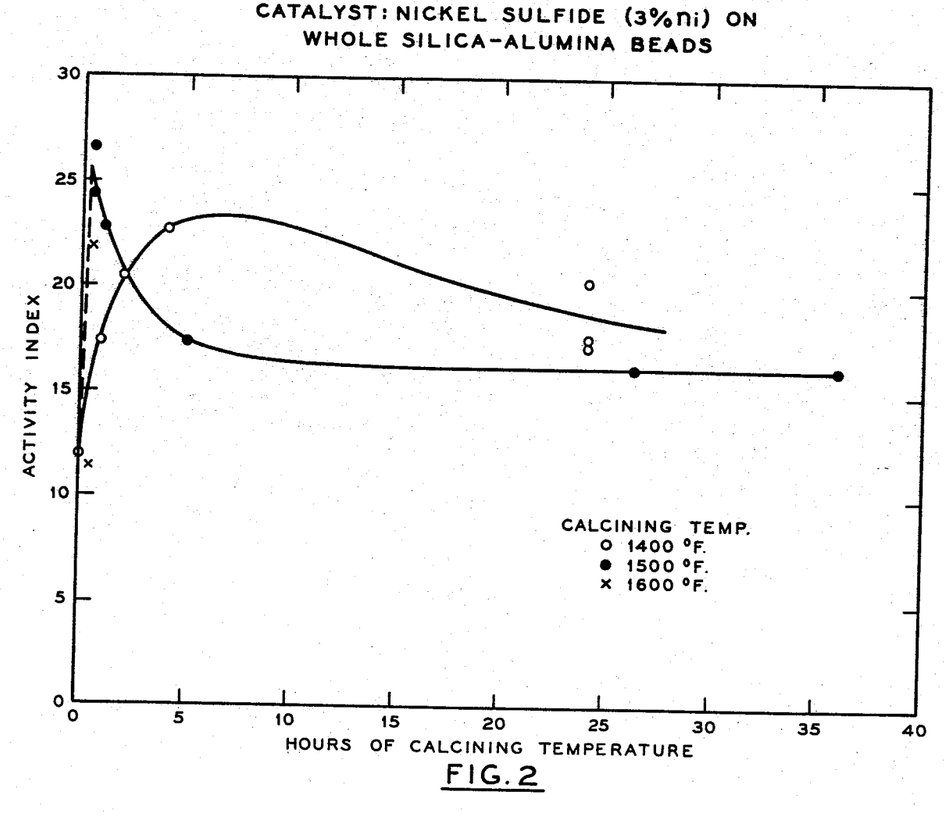

As indicated above, when heat-treating temperatures significantly above 1400° F. are employed, it is important that the duration of said treatment be closely controlled so as to prevent over treatment with ensuing decline in activity from previously established levels. Thus, while at 1400° F. a representative catalyst containing nickel sulfide (3% Ni) on whole silica-alumina beads rises rapidly in activity as the treatment is extended over a five-hour heating period and thereafter experiences but a gradual decline in activity as the heat treating period is extended to 24 hours or more, this is not the case when the heat treatment is conducted at 1500° F. In the latter case, peak activities are reached in periods of 30 to 60 minutes, after which the catalyst activity rapidly declines. Thus, at the end of the five hours of heat treatment at 1500° F. the catalyst loses in excess of 50% of the activity gained during the initial stages of the heat treating period. These results are graphically demonstrated in the curves presented in FIG. 2 of the drawings wherein activity index of the catalyst is plotted against time of heat treatment, the one curve of the figure showing results obtained at 1400° F. and the other relating to results obtained at 1500° F. Additionally, two points are shown for operations conducted at 1600° F. The catalyst employed in making these runs was one prepared by impregnating silica-alumina beads with an aqueous solution of nickel acetate in a concentration sufficient to establish 3 weight per cent nickel on the catalyst in its finally prepared state. The impregnated catalyst was dried at 250° F. for 10 hours, following which it was heated to 1400° F., 1500° F. or 1600° F. for the periods of time shown in the curves of FIG. 2. Following heat treatment at such temperatures, the catalyst was sulfided by means of the procedure outlined above in connection with the data of FIG. 1 before being tested to determine the activity index level. The data of the curve pertaining to treatment at 1400° F. show that the catalyst is only marginally sensitive to deactivation with time. On the other hand, the 1500° F. curve shows that the catalyst is rapidly deactivated if treatment is continued for more than 1.0 or possibly 1.5 hours. The two points indicated for a 1600° F. treatment represent the results obtained in companion experiments thought to be conducted under essentially the same conditions. However, it is obvious that at this temperature level, extremely small differences in treating time must exert an inordinately large effect on activity. From these data it is concluded that the heat treating step of the present invention is preferably conducted at temperature levels below 1550° F. in order to insure the production of a catalyst of desired activity under the somewhat variable conditions encountered in commercial operation. On the other hand, temperatures above 1300° F. are preferably employed in order to insure the production of catalysts of relatively high activity.

EFFECT OF CATALYST NICKEL AND COBALT CONTENT ON ACTIVITY

As regards the content of nickel or cobalt in the catalyst, it is found that activity increases with increasing metal content, said increase being particularly significant in the lower portions of the nickel and the cobalt ranges, i.e., in the range of from about 0.5 to 1.5 wt. percent nickel and from about 3 to 4 wt. percent cobalt. This fact, in the exemplary case of nickel, is shown by the data presented in curves A and C of FIG. 3 where the activity index is plotted against the nickel content of the catalyst. The catalysts employed in deriving curve A were prepared in the same fashion as those described above in connection with FIG. 1, the only difference (aside from variation in nickel content) being that all catalysts, after being calcined for 10 hours at 1000° F., were then heated for 24 hours at 1400° F. Curve B shows the activity index of companion catalysts prepared in the same fashion, but without the practice of the 1400° F. heating step.

Figure 3:
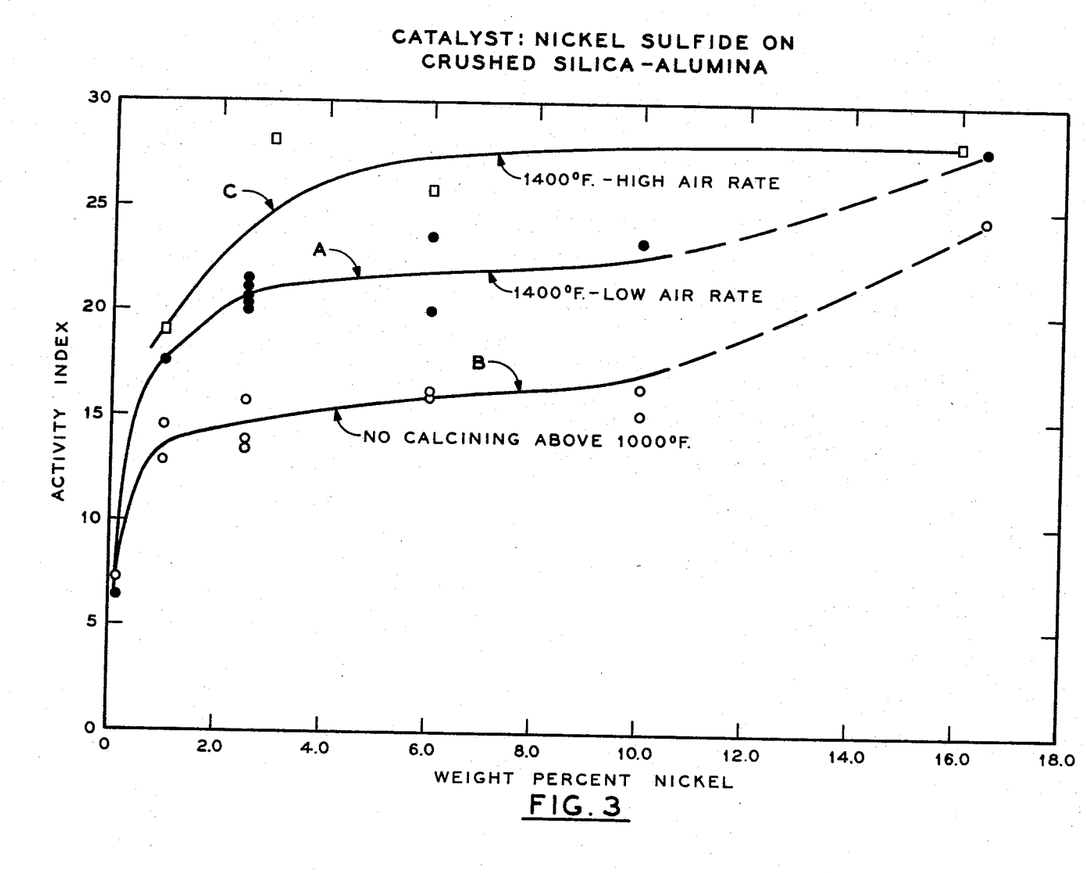

Curve C presented in FIG. 3 gives further data wherein nickel content of the catalyst is plotted against the activity index. In this case, however, the cracking support employed was made up of the whole rather than the crushed beads, as referred to above. Further, the method of preparation, while otherwise following the procedures given above in connection with the data of FIG. 1, involved heating the nickel acetate impregnated beads for 10 hours at 250° F. and then 4 hours at 1400° F. at a (dry) air rate of 700 cu. ft. per hour, per cu. ft. of catalyst. It will be observed that in these runs activity index also increases with nickel content, though the said index is higher than that shown in curve B. This increase is attributable primarily to the increased rate of hot air flow.

EFFECT OF CATALYST NICKEL AND COBALT CONTENT ON AROMATICS SATURATION

Increasing the content of cobalt or nickel on the catalyst also has the effect of increasing the tendency of the catalyst to saturate aromatics when the latter are present in the feed stock employed, and, as a general rule, it is desired to keep such aromatics-saturation at a relatively low level. A good index of the extent to which aromatics saturation occurs is afforded by measuring the aniline point of the product obtained from a given reference feed at varying nickel contents. In the general range of from about 0.5 to 6% nickel the tendency to saturate aromatics increases smoothly in generally the same manner for both the catalysts of curve A and those of curve B. However, at a point varying between about 6% and 10% nickel, the extent of aromatics saturation turns rather sharply upward, the increase being much greater for the curve B catalysts than it is for those of curve A which have been heat treated in accordance with the method of this invention.

In view of this increasing tendency to saturate aromatics, the preferred catalysts of this invention generally contain less than about 10% by weight nickel (or 12% by weight cobalt) while minimal nickel and cobalt contents of approximately 1.5 and 4 weight percent, respectively, are preferably observed to insure the resultant production of catalysts falling in the higher portion of the desired activity range.

NECESSITY FOR USE OF DRY GAS WHEN HEAT TREATING CATALYST

Figure 4:
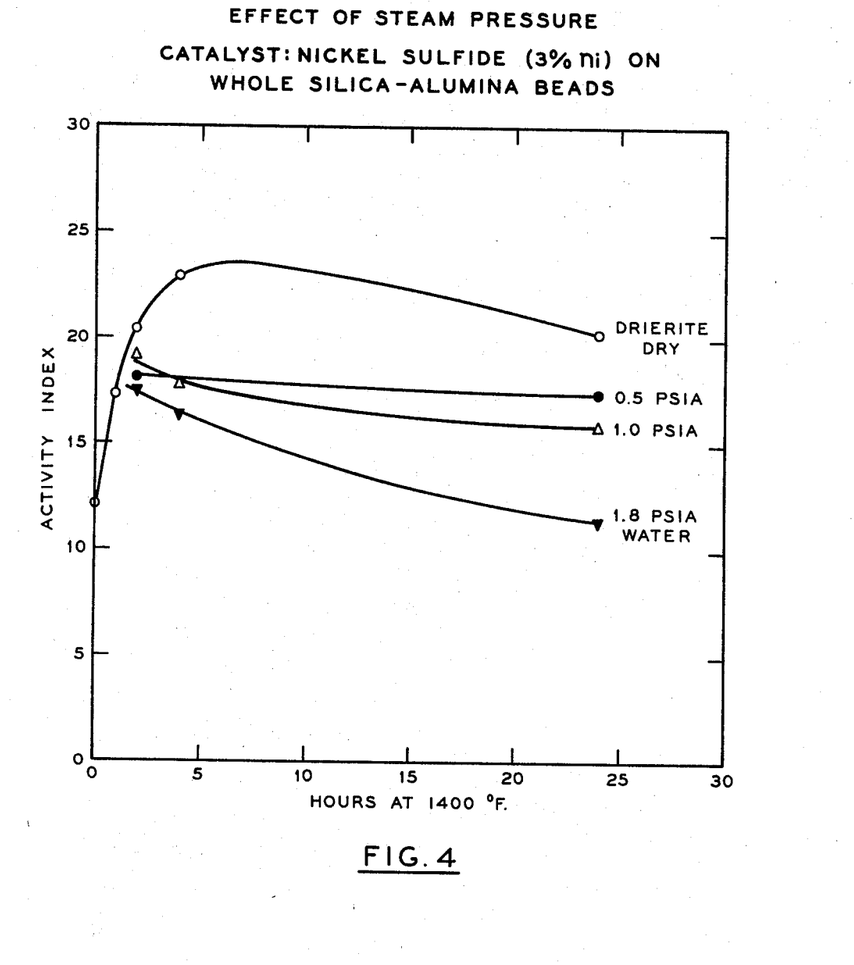

In passing the heated gas through the catalyst to effect heat treatment thereof, it is important that the content of water vapor therein be kept as low as possible, the partial pressure of water vapor in the system being maintained below about 1.5 p.s.i.a. in any event and preferably below 0.5 p.s.i.a. The necessity for thus controlling the water content of the gas is evidenced by the data presented in the curves shown in FIG. 4 wherein the activity index of catalysts comprising nickel sulfide (3% Ni) on whole beads is plotted against length of treatment at 1400° F. at an air rate of 25 VHSV, the air streams employed variously having water vapor partial pressures of 1.8, 1.0, 0.5 and substantially 0.0 p.s.i.a. It will be observed from these curves that the activity index of the non-thermally treated catalyst rises from an original level of 12 to one of approximately 23.5 at the end of about 8 hours treatment at 1400° F. using an air stream wherein the water vapor content has been reduced to substantially zero by previous passage through a desicant bearing the trade name "Drierite." However, as water vapor is added to the gas stream in increasing amounts, the activity index of the catalyst, while initially raised to a level of about 18–20 at water vapor partial pressures of from 0.5 to 1 p.s.i.a, and to one of 17 at 1.8 p.s.i.a., thereafter rapidly falls with further heating. This loss in activity is particularly severe in the case of the gas streams having a water vapor partial pressure of 1.8 p.s.i.a. Accordingly, as noted above, the preferred practice of carrying out the method of this invention is to use a gas stream which is either substantially devoid of water vapor or one which in any event has a water vapor partial pressure of not more than about 0.5 p.s.i.a.

VAPOR HOURLY SPACE VELOCITY (VHSV) OF HEATED DRY GAS STREAM

Figure 5:
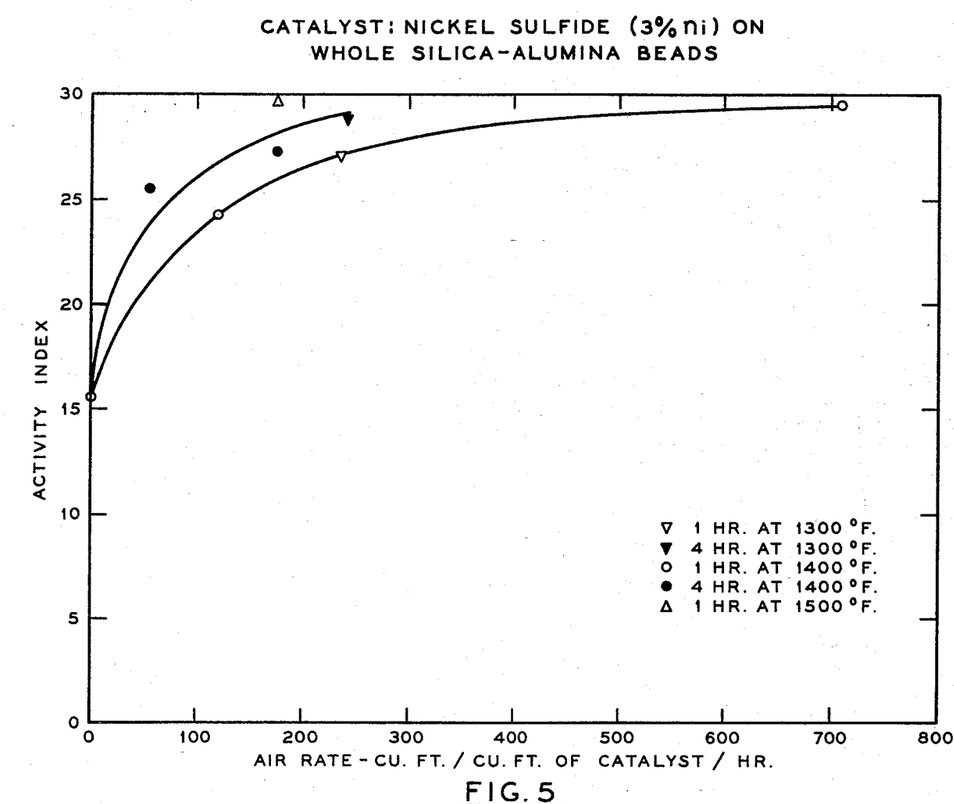

Reference has been made above to the fact that the heat treating step of this invention requires that a heated gaseous stream of non-reducing character be passed through the catalyst mass. This gaseous stream is preferably passed through the same mass at a vapor hourly space velocity (VHSV) of at least 10 in order to provide a satisfactory increase in catalyst activity. This minimal rate assumes the use of ambient conditions of pressure and would, of course, be somewhat greater in the case of those operations conducted at superatmospheric pressures. On the other hand, at subatmospheric pressures the rate could be less than 10, such variables being in part a function of the density of the gaseous stream employed. Whatever pressure conditions be employed, it is found that resultant catalyst activity increases in substantial measure with the rate at which the heated gas is passed through the catalyst. This effect is one which as already been noted above in connection with curve C of FIG. 3, and further data in support thereof are presented in FIG. 5 of the drawings wherein the activity index of a typical catalyst containing nickel sulfide (3% Ni) on whole silica-alumina beads is plotted against a rate at which dry air is passed through the catalyst at temperatures of 1300, 1400 and 1500° F. for 1 hour, in certain of the runs, and for 4 hours in others thereof. As will be seen from the lower of the two curves of said figure, the activity index of the catalyst rises appreciably with increasing air rate in operations conducted at 1300° F. or 1400° F. for one hour. The rise is even greater (see the upper curve) as such temperatures are maintained over the catalyst for four hours. As indicated by the single point shown at an air rate of 175 cu. ft., a still higher increase in activity index is obtained when treating the catalyst for one hour at 1500° F. From the shape of these curves, it is obvious that the activity index rises most rapidly as the gas rate over the catalyst increases from minimal values to those of approximately 150 cu. ft., the increase being more gradual at higher gas rates. Accordingly, the catalysts of this invention are preferably prepared by passing the heated air or other non-reducing gas employed through the catalyst mass undergoing treatment at a space rate (VHSV) of at least 150.

METHOD OF DETERMINING ACTIVITY INDEX

A. *Test feed stack used.*—The test to determine the activity index of the catalyst broadly involves a determination of the conversion of a standard and readily obtainable hydrocarbon feed stock of defined physical and chemical characteristics to products falling below the boiling point of said stock under defined operating conditions. The feed stock employed is a catalytic cycle oil recovered as a distillate fraction from the effluent of a fluid type of catalytic cracking unit, the recovered fraction being one containing essentially equal proportions of aromatics and of paraffins plus naphthenes, and boiling over a range of from approximately 400 to 575° F., as determined by ASTM D–158, prior to any hydrofining treatment given the feed to reduce its basic nitrogen content to a level below 5 p.p.m., this being the maximum amount permitted in the test feed. The specific test feed employed in obtaining the activity index values given herein was obtained from a fluid catalytic cracking unit being charged with a mixture of light and heavy gas oils cut from a Los Angeles Basin crude. This test stock was hydrofined by passing the same along with 3500 s.c.f. hydrogen per barrel of naphtha through a hydrofining catalyst containing cobalt oxide (2% cobalt) on a coprecipitated molybdena-alumina (9% molybdenum) support at pressure of 800 p.s.i.g., an LHSV of 1, and at a temperature between 700° F. and 750° F. This hydrofining operation was accompanied by a hydrogen consumption of 300 to 400 s.c.f. hydrogen per barrel of feed and resulted in a reduction of the basic nitrogen content in the liquid effluent to less than 5 p.p.m. The hydrofined test stock had the following inspections:

TABLE I.—INSPECTIONS OF TYPICAL HYDROFINED CYCLE OIL TEST SAMPLE

| | |
|---|---|
| Gravity, °API | 30 |
| Aniline point, °F. | 93 |
| Nitrogen (basic), p.p.m., below | 5 |
| Aromatics, vol. percent | 48 |
| Olefins, vol. percent | 1 |
| Paraffins plus naphthenes, vol. percent | 51 |
| ASTM distillation (D-158): | |
| Start | 357 |
| 5% | 420 |
| 10% | 434 |
| 30% | 460 |
| 50% | 476 |
| 70% | 493 |
| 90% | 519 |
| 95% | 532 |
| End point | 570 |

Prior to hydrofining, the cycle oil had a gravity of 28° API, an ASTM D-158 start of about 400° F., and a basic nitrogen content of about 175 p.p.m. The reduction in ASTM start in hydrofining was due to a small amount of cracking.

B. *Test equipment used.*—The equipment employed in determining the activity index of the catalyst is a conventional continuous feed pilot unit, operated once-through with hydrocarbon feed and hydrogen gas. It consists of a cylindrical reaction chamber operated downflow with a preheating section, followed by a section containing the catalyst under test, and enclosed in a temperature controlled metal block to permit controlled temperature operation, together with the necessary appurtenances, such as feed burettes, feed pump, hydrogen supply, condenser, high pressure separator provided with means for sampling the gas and liquid phases, back pressure regulators, and thermocouples. For accuracy in hydrogen feed, hydrogen is compressed into a hydrogen accumulator or burette whence it is fed to the reactor by displacement with oil fed at constant rate from a reservoir by means of a pump.

C. *Test procedure used.*—In testing a catalyst to determine its activity index, the foregoing hydrofined cycle oil test stock, along with 8000 s.c.f. $H_2$ per barrel of feed, is passed through a mass of catalyst (65 ml. were actually employed) at a liquid hourly space velocity of 2 and at a furnace temperature of 610° F., the actual feed rate employed being 130 ml. per hour. The run is continued for 14 hours under these conditions, with samples being collected at about two-hour intervals. These samples are allowed to flash off light hydrocarbons at ambient temperature and pressure, following which a determination is made of the API gravity of each sample. The aniline point of the samples may also be determined when it is desired to obtain an indication of the relative tendency of the particular catalyst to hydrogenate aromatics present in the feed. The individual API gravity values are then plotted and a smooth curve is drawn from which an average value may be obtained. Samples collected at the end of the eighth hour of operation are usually regarded as representative of steady-state operating conditions and may be distilled to determine conversion to product boiling below the initial boiling point of the feed. This conversion under steady test conditions is a true measure of the activity of the catalyst. However, the API gravity rise, that is, the API gravity of the product sample or samples minus the API gravity of the feed, is a rapid and convenient method of characterizing the catalyst which correlates smoothly with conversion. For convenience the foregoing API gravity rise is referred to as the activity index of the catalyst.

D. *Temperature at which activity index is made.*—The activity index values employed herein are all of the 610° F. variety, said temperature being that of the test described above. However, certain of the more active catalysts (notably those giving per pass conversions in excess of about 70% at 610° F.) are activity index tested at 570° F. The gravity rise values so obtained may then be converted to 610° F. values by correlation using data obtained by testing the same catalysts at both temperatures. Thus, the data of curve C of FIG. 3 were obtained by correlation from 570° F. values.

E. *Activity indices of other cycle stocks.*—While reference has been made above to the use of a particular catalytic cycle stock in connection with determining the activity index of the catalyst, it is believed that similar activity index values can be obtained with catalytic cycle stocks obtained from other than California crudes provided the sample employed as feed has substantially the same characteristics as that of the feed described above. While the use of such other test feeds may give slightly different absolute values than those described herein, such differences are without influence on conclusions reached relating to catalyst activity inasmuch as the test stock is serving primarily as a relative standard by which to judge the conversion activity of the catalyst.

DETERMINATION OF SEVERITY FACTOR OF CATALYSTS GENERALLY

The aniline points of the samples obtained by the method of the proceeding paragraphs, when compared with the aniline point of the feed, offer an index to the capacity of the catalyst to produce a satisfactory balance between the simultaneous conversion reactions involving disproportionation-cracking, isomerization-cracking, and hydrogenation. A more specific index of the balance of catalytic components necessary to effect the desired selectivity in the multiphase reactions of the process is determined by reference to the "severity factor" ($S_a$) of the catalyst composition. This characteristic of the catalyst may be determined by subjecting the catalyst to a standardized test wherein the reference feed stock is a trimethylbenzene, such as pseudocumene, or an equilibrium mixture of trimethylbenzenes which may be obtained from a catalytically reformed naphtha. When employing the latter trimethylbenzene concentrate, a narrow boiling fraction having a D 86 distillation range from about 318°–335° F. and a $C_9$ aromatic content of at least 95 volume percent should be used. The test involves passing the reference feed stock through the test catalyst at a liquid hourly space velocity of 2.0 with 9000 s.c.f. of hydrogen per barrel of feed while maintaining a catalyst temperature of 650° F. and a pressure of 1200 p.s.i.g. This test operation is continued for a period of time (usually about 2 to 5 hours) sufficient to stabilize the system, and thereafter for a time sufficient to provide an adequate product sample. After flashing to atmospheric pressure the liquid product is then fractionated to determine the volume percent of product boiling below 300° F., relative to feed. This is taken as the synthetic product. Aromatic contents of the reference feed and said synthetic product are determined, as by chromatographic analysis (FIAM method), and the severity factor, $S_a$, is calculated from the expression:

$$S_a = \frac{A_f}{A_p} - 1$$

where $A_f$ = volume percent aromatics in the feed, and
$A_p$ = volume percent aromatics in the synthetic product.

SEVERITY FACTOR OF CATALYST OF PRESENT INVENTION

When the catalyst of the present invention is employed in the conversion of hydrocarbon feed fractions containing substantial amounts of aromatic components, it is generally desirable that the catalyst have a severity factor having a value falling within a range of from about 0.1 to 2.0. It is found that the catalyst in fact has values falling within this range when the nickel content thereof falls in a range of from about 0.5 to 10% by weight, while with cobalt satisfactory severity factor values are obtained over a range of from about 3 to 12% by weight. This is established in the case of nickel by the data presented below in Table II wherein the catalysts employed are those described above in connection with curve A of FIG. 3.

TABLE II.—EFFECT OF VARYING NICKEL CONTENT ON CATALYST ACTIVITY AND LOSS OF AROMATICS

| Weight Percent Nickel in Catalyst | 610° F. Activity Index | Aniline Point of Whole Once-Through Liquid Product From Activity Index Determination (Feed=93.0) | Volume Percent Aromatics in Whole Liquid Product From Activity Index Determination (Feed=48.0) | Severity Factor, $S_a$ |
|---|---|---|---|---|
| 1.0 | 17.5 | 95.5 | 39.5 | 0.5 |
| 2.5 | 20.3 | 97.5 | 28 | 1.0 |
| 6.0 | 21.5 | 101.0 | 25.5 | 1.5 |
| 10.0 | 22.6 | 104.0 | 22.7 | 1.8 |

SILICA CONTENT OF CATALYST SUPPORT

In various of the catalyst compositions described above the cracking component has been a synthetic silica-alumina material containing approximately 90% by weight silica. However, experience shows that the catalyst of the present invention can be prepared with cracking supports containing from about 50 to 99% by weight silica. Thus, as shown below in Table III, catalysts containing nickel sulfide (2.5 wt. percent Ni) were prepared using various supports. One portion of each catalyst so prepared was calcined in the conventional manner for four hours at 1000° F. while the other portion thereof was heated in a stream of dry air (at a VHSV of about 25) for four hours at 1400° F. Activity indexes of at least 18 were obtained with those catalysts having silica contents of 90, 97 and 99%, but not with those compositions wherein the support was essentially comprised of pure silica or pure alumina. The aforementioned lower silica content of 40% is set so as to include the various acid treated natural clays, as well as the more generally available synthetic cracking supports wherein the silica content normally ranges upwardly from about 70%.

TABLE III.—NICKEL SULFIDE (2.5% Ni) ON VARIOUS SUPPORTS

|  | 1 | 2 | 3 | 4 | 5 | 6 |
|---|---|---|---|---|---|---|
| Support: |  |  |  |  |  |  |
| Silica, wt. percent | 90 | 100 | 99 | 97 | 6 | 0.5 |
| Alumina, wt. percent | 10 | 0 | 1 | 3 | 93 | 99.5 |
| Surface Area, m.²/g | 438 | 563 |  |  |  |  |
| Activity Index: |  |  |  |  |  |  |
| After calcining 4 hrs. at 1,000° F | 14.7 | 1.4 |  | 16 |  | 1.0 |
| After calcining 4 hrs. at 1,400° F | 22.7 | 1.3 | 18.2 | 20 | 1.0 | 0.6 |

EFFECT ON CATALYST ACTIVITY OF PRESENCE OF METALS OTHER THAN COBALT AND NICKEL

The present catalyst has been described as one wherein the hydrogenating component is made up of compounds of cobalt and/or nickel. However, it is also possible to include small amounts of other metals known to possess hydrogenation-dehydrogenation characteristics along with the cobalt-nickel compounds, though insofar as can be determined the inclusion of such other metals is without any particular significance on the activity of the catalyst. Table IV below presents comparative activity indexes obtained with various catalysts all having the same cracking support (90% silica—10% alumina) but with varying amounts of nickel and cobalt and, in certain cases, with nickel composited with other metals, namely, chromium, copper or molybdenum. Those catalysts containing only nickel were prepared by impregnating the support with an aqueous solution of nickel acetate or nickel nitrate; that including nickel and molybdenum was prepared using a solution of nickel acetate and ammonium molybdate; that with nickel and chromium was prepared using a solution of nickel acetate and chromium acetate; and those embodying only cobalt or both nickel and copper were prepared using a solution of a chelate formed between the metals and ethylenediamine tetraacetic acid.

TABLE IV.—ACTIVITY INDEXES—VARIOUS METALS

|  | Metal | | | | | | |
|---|---|---|---|---|---|---|---|
|  | 3% Ni | 2% Co | 4% Co | 2.5% Ni | 3% Ni 0.3% Cr | 3% Ni 0.3% Cr | 3% Ni 0.2% Mo |
| Sulfided | Yes | Yes | Yes | No | Yes | Yes | Yes |
| Activity Index: |  |  |  |  |  |  |  |
| After 4 hrs. at 1,000° F | 14.7 | 14.1 | 12.1 | 10.5 |  | 12.5 |  |
| After 3 hrs. at 1,400° F | 22.7 | 14.3 | 19.1 | ¹ 24.0 | 23 | 21.4 | 21.0 |

¹ 24 Hrs. at 1,400° F.

PROCESSES IN WHICH CATALYST MAY BE USED

The thermactivated catalysts prepared by the method of this invention can be employed in a wide variety of hydrocarbon conversion processes, including those of modified (or low temperature) hydrocracking, hydrogenation-dehydrogenation, isomerization, polymerization and alkylation.

EFFECT OF USING CATALYST IN OXIDE OR SULFIDE FORM

Moreover, said catalysts can be employed in the oxide form existing at the conclusion of the thermactivation step or in the form obtained by reducing the metal oxides either prior to using the catalyst or as an incident of placing the unit on stream with a hydrogen-containing feed stream. Preferably, however, the nickel and/or cobalt present on the catalyst are converted to the sulfide form before the catalyst is used in the desired hydrocarbon conversion operation, this being particularly true with processes of the type generally referred to above and described more particularly hereinafter wherein hydrocarbon feed stocks are converted at low temperatures to lower boiling products having excellent fuel characteristics, said conversion being effected with essentially nominal losses to coke and light gases of little economic value. When an attempt is made to effect said conversion operation by using a thermactivated catalyst wherein a nickel or cobalt are present in the oxide or reduced oxide (metal) form, it is found that such catalysts effect a large initial saturation of aromatics present in the feed. This reaction is strongly exothermic and thus induces the formation of hot spots in the catalyst bed, a phenomenon which is accompanied by accelerated fouling of the catalyst with its resultant decrease in catalyst activity. On the other hand, catalysts which are sulfided prior to being used in this hydrocarbon conversion operation do not exhibit this undesirable tendency toward over saturation of aromatics and thus permit the unit to be brought onstream at high conversion levels without giving rise to any abnormally high rate of catalyst fouling. Start-up difficulties are also eliminated in large measure even when using the catalyst in the nonsulfided form provided a feed stream is used which has a high enough sulfur level to effect a rapid sulfiding of the catalyst, a method of operation which is generally the equivalent of initiating a given hydrocarbon conversion cycle with the use of the catalyst in the pre-sulfided form. It should also be noted that the hydrocarbon conversion reaction follows a somewhat different path when using a sulfided rather than a non-sulfided catalyst, the former giving a much higher ratio of iso to normal paraffins in the resulting product, when using paraffinic petroleum feed stocks.

METHOD OF SULFIDING CATALYST

Sulfiding of the thermactivated catalyst can be effected by the practice of a variety of methods, it being borne in mind, however, that the catalyst, whether employed in the sulfided condition or not, should be protected from contact with moisture before being used. Should the catalyst become wet or otherwise contaminated with moisture, it is necessary to subject the same to a rethermactivation treatment of the type described herein to bring its activity back to the desired level, the nickel or cobalt present being converted to the oxide form (if not already present as such) before repeating the thermactivation step.

When converting the nickel oxide and/or the cobalt oxide present on the catalyst to the sulfide condition, it usually is desirable and convenient to load the thermactivated catalyst into the reactor, purge with inert gas, shift to hydrogen flow, and adjust to the normal process "onstream" operating temperature before starting to sulfide the reduced nickel or cobalt, as by the addition of hydrogen sulfide or the like. Temperatures above about 750° F. should not be employed when sulfiding. Hydrogen sulfide may either be fed to the reactor as such, or formed by feeding carbon disulfide, light mercaptans, or organic addition of sulfides and disulfides and the like, either with or without the simultaneous hydrocarbon stream. An equivalent procedure is to come up to temperature with an inert gas, sulfide the oxide directly, and then shift to hydrogen before going on stream. In any case a stream of dry hydrogen or other nonoxidizing gas should be maintained to remove adsorbed oxygen and water formed by conversion of the oxide to a sulfide. In no case should the catalyst be brought up to any temperature approaching 1000° F. with nickel or cobalt in the reduced or sulfided state.

SUITABLE FEEDSTACKS AND PRODUCTS OBTAINABLE WITH USE OF CATALYST AT LOW TEMPERATURES

The catalyst of this invention, while useful in a number of hydrocarbon conversion processes, finds particular utility in operations involving the conversion of hydrocarbon fractions to lower boiling products at relatively low conditions of temperature. As a general proposition, the charging stocks employed in a conversion operation of this character, which is effected along with added hydrogen, may be any of the conventional hydrocarbon distillate fractions boiling in the range of about 100° F. to 850° F. and having a total nitrogen content below about 100 p.p.m. through hydrofining or otherwise. Suitable feeds which may be employed to provide such selected stocks are those generally defined as fractions containing $C_6$, $C_7$ and/or $C_8$ hydrocarbons, light or heavy gasolines, naphthas, kerosene distillates, light or heavy gas oils, catalytic cycle oils, and the like. These may be of straight-run origin, as obtained from petroleum, or they may be derived from various processing operations, and in particular, from thermal or catalytic cracking of stocks obtained from petroleums, gilsonite, shale, coal tar or other sources. Products, depending on the aromaticity or paraffinicity of the feed, may comprise light branched hydrocarbons such as isobutane and isopentane, high octane motor gasoline, a catalytic high octane, and reformer feed of high naphthene content, petrochemical intermediates such as xylenes, durene, etc., high quality diesel and jet fuels, low pour fuels from high pour fuels, and the like. The process conditions to be observed in carrying out this conversion operation are described in ensuing paragraphs, with a typical operation being thereafter set forth in the example.

CONDITIONS FOR TYPICAL LOW TEMPERATURE CONVERSION OPERATION

The conversion zone is operated under a pressure ranging from about 400 p.s.i.g. to 3000 or more and at average catalyst temperatures in the range of about 450° to 800° F., with the temperatures being so regulated as to initiate the conversion reaction at a temperature below 730° F., and to maintain the average catalyst temperatures at levels below about 730° F. during at least the first half of any given conversion period (i.e., the period during which the catalyst remains on-stream before being subjected to regeneration or replacement).

EFFECT OF NITROGEN ON CONVERSION PROCESS

One of the important variables in the conduct of the conversion process which has a material effect and, to that extent, permits the production of the desired products is the control of the nitrogen content of the charge stock. As indicated, an acceptable total nitrogen level is 100 p.p.m., about 25 p.p.m. in terms of basic nitrogen, although appreciable further improvement is obtained as this basic nitrogen content is reduced to levels below 10 p.p.m. These nitrogen levels may be reached by hydrofining the feed stock by treating the same with hydrogen at elevated temperatures and pressures in the presence of a hydrogenating catalyst which has little cracking activity and little tendency to saturate aromatics under the conditions employed.

USE OF HYDROGEN IN CONVERSION PROCESS

In the operation of the conversion process, the charge stock may be introduced to the reaction zone, in admixture with hydrogen, as either a liquid, vapor or mixed liquid-vapor phase, depending upon the temperatures, pressure, proportions of hydrogen and boiling range of the charge stocks utilized. This charge stock is introduced in admixture with at least 2000 s.c.f. of hydrogen per barrel of total feed (including both fresh, as well as recycle feed), and this amount of hydrogen may range upwardly to 15,000–20,000 s.c.f. per barrel of feed. From about 1000 to 2000 s.c.f. of hydrogen is consumed in most instances in the conversion zone per barrel of total feed converted to synthetic product, i.e., that boiling below the initial boiling point of the fresh feed. The hydrogen stream admixed with incoming feed is conventionally made up of recycle gas recovered from the effluent from the conversion zone, together with fresh make-up hydrogen. The hydrogen content of the recycle stream in practice generally ranges upwardly of 75 volume percent.

LIQUID HOURLY SPACE VELOCITY OF FEED TO CONVERSION PROCESS

Generally, the converter feed may be introduced to the reaction zone at a liquid hourly space velocity (LHSV) of from about 0.2 to 5 volumes of hydrocarbon (calculated as liquid) per superficial volume of catalyst with a preferred rate being from about 0.5 to 2 LHSV.

REACTION TEMPERATURE IN CONVERSION PROCESS

Probably the most characteristic and, to that extent, critical process variable in the subject conversion process is the specification on reaction temperatures. As hereinabove prescribed, the process may be conducted at instantaneous catalyst temperatures in the range of about 450° F. to 800° F., provided the conversion reaction is initiated at temperatures falling below about 730° F. and is maintained at an average temperature below about 730° F. during at least the first half of the conversion period. Directionally, these specifications on catalyst (i.e., reaction) temperatures maximize the low-temperature operation of the conversion process employing the catalyst of the invention which has been found requisite to produce maximum length of run and optimum product quality.

STARTING TEMPERATURES FOR CONVERSION PROCESS

It is preferred that the temperature at which the reaction is initiated in a given on-stream period should be as low as possible (commensurate with the maintenance of adequate per-pass conversion levels), since the lower the starting temperature the longer will be the duration of the said on-stream period, particularly that portion thereof employing instantaneous catalyst temperatures below 730° F. For any given conversion, the permissible starting temperature is a function of catalyst activity since the more active catalysts, such as the catalyst of the invention, naturally permit the unit to be placed on-stream at lower starting temperatures for a given per-pass conversion than would otherwise be the case. In any event, the conversion reaction should be initiated at temperatures below about 730° F., with a preferred range being from 450° F. to 675° F. In some cases it may be desirable to initiate the reaction at temperatures below 450° F., with higher temperatures then being reached in a relatively short period of time as the catalyst becomes conditioned. Moreover, with all except the most refractory feed stocks, and assuming the use of a catalyst of relatively good activity, instantaneous catalyst temperatures below about 700° F. can be maintained during at least the first half of the on-stream portion of any given processing cycle (or the portion productive of at least one-half of the total product, as aforesaid), and this method of operation is preferred.

PER PASS CONVERSION IN CONVERSION PROCESS

In a preferred practice, the conversion is conducted at a given space rate under conditions of relatively constant conversion of at least 20% per pass, and preferably at constant conversions falling in the range of about 20% to 80% per pass. Under this type of operation, the catalyst temperature is periodically increased to maintain the per-pass conversion at relatively constant levels. Alternatively, the process may be conducted at a constant temperature of about 730° F. or lower, under which conditions the per-pass conversion will gradually decline and the on-stream portion of the processing cycle will be terminated at an arbitrary conversion level.

The following example is presented to illustrate by one embodiment the practical application of the catalyst of the invention to the conversion of hydrocarbons.

Example I

A. *Feedstock and hydrofining thereof.*—The feed stock for these runs was derived from a heavy naphtha fraction representing a blend from a thermal and a catalytic cracking process, both operating on crude gas oils of California origin. This naphtha fraction which had a boiling point range of approximately 220–440° F. and contained 140–150 p.p.m. of basic nitrogen, was hydrofined by passing the same along with 3500 s.c.f. hydrogen per barrel of naphtha through a hydrofining catalyst containing cobalt oxide (2% cobalt) on a coprecipitated molybdena-alumina (9% molybdenum) support at a pressure of 800 p.s.i.g. an LHSV of 2, and at a temperature between 700° F. and 750° F. This hydrofining operation was accompanied by a hydrogen consumption of 300–400 s.c.f. hydrogen per barrel of feed and resulted in a reduction of the basic nitrogen content in the liquid effluent to less than 1 p.p.m. On distillation of the hydrofining effluent, a liquid fraction was recovered having the following specifications:

| | |
|---|---|
| Gravity, ° API | 36.7 |
| Aniline Pt., ° F. | 88.6 |
| Aromatic content, vol. percent | 43 |
| Sulfur, p.p.m. | 2 |
| Total nitrogen, p.p.m. | 0.6 |
| F-1 octane (+3 ml. TEL) | 80.7 |
| ASTM D 86 distillation, ° F.: | |
| Start | 370 |
| 10% | 376 |
| 30% | 379 |
| 50% | 383 |
| 70% | 389 |
| 90% | 405 |
| End point | 455 |

B. *Catalyst used and preparation thereof.*—The foregoing hydrofined feed stock, along with 6500 s.c.f. $H_2$ per barrel of feed, was preheated to 596° F. and passed at a space velocity of 1.1 and a pressure of 1200 p.s.i.g. through a fixed bed of catalyst comprising nickel sulfide (3% Ni) on silica-alumina beads containing approximately 90% by weight silica and being the silica-alumina beads referred to above. Said catalyst was prepared by impregnating 15 liters of said beads with 12 liters of an aqueous solution containing 4336 grams of nickel acetate [$Ni(CH_3COO)_2 \cdot 4H_2O$] at 125° F. Following the impregnation step, the beads were drained of excess liquid and heated for 10 hours at 250° F. Following this drying step, the beads were calcined at 400° F. for two hours, at 600° F. for one hour and then at 1000° F. for 10 hours, a stream of dry air being passed over the beads at approximately 25 VHSV during these drying and calcining stages of catalyst preparation. Thereafter, 14.2 liters of the catalyst which now contained nickel oxide in an amount equivalent to 3 wt. percent nickel, were placed in a muffle and heated for two hours at 400° F., one hour at 600° F., three hours at 1000° F., two hours at 1200° F. and 24 hours at 1400° F., a stream of dry air (previously dried by passage over Drierite desiccant) being passed through the muffle at a rate between about 10 to 25 VHSV during this muffling operation. The resulting thermactivated catalyst was then transferred to the reactor vessel for reduction and sufiding. Specifically, once the catalyst was in the reactor, hydrogen at ambient conditions of temperature and pressure was passed through the unit with the temperature of the hydrogen stream gradually being raised at a rate of 50° F. per hour until a temperature of 560° F. was reached. At this point the system pressure was raised to 1200 p.s.i.g. and maintained at that level for one hour following which the hydrogen feed was admixed with a hydrocarbon stream comprising mixed hexanes containing 5 weight percent carbon disulfide, the proportion of hexanes to hydrogen being adjusted so as to give the equivalent of 2 mole percent $H_2S$ in hydrogen. This sulfiding step, at a space rate (LHSV) of 0.22, was continued for three hours at 1200 p.s.i.g. and 560° F., following which the system was depressured to eliminate excess $H_2S$. A pressure of 1200 p.s.i.g. was then reestablished by passing the hydrofined naphtha feed described above along the 12,000 s.c.f. $H_2$/bbl. feed over the catalyst at a space rate of 1.1. Catalyst temperatures were gradually raised until per pass conversion reached 60% at 596° F. At this point the hydrogen feed rate was cut back to 6500 s.c.f. per barrel of feed and the run proper was commenced. This catalyst had an activity index of 19.7.

C. *Conduct of run.*—As the run progressed at 1.1 LHSV and 1200 p.s.i.g., the mixed feed-hydrogen stream to the unit was gradually raised in temperature as required to maintain the per pass conversion (to product boiling below 360° F.) at 60%. After the unit had been on stream for a total period of 622 hours, the hydrogen feed rate was increased to 12,000 s.c.f. per barrel and was maintained at that level through the 1110th hour of the run. At this point the feed rate was reduced to 0.8 LHSV and the hydrogen rate cut back to the 6500 s.c.f. level until the run was finally concluded at the end of 1750 hours of operation, at which point the average catalyst temperature was 679° F. It is estimated that the run could have been extended to about 5700 hours before catalyst temperatures of 750° F. would have been reached.

During the initial 1110 hours of the run, the operation was conducted on a once-through basis with no attempt being made to recycle the 360° F.+ bottoms to the catalyst, though other experiments showed that said bottoms could be converted in essentially the same fashion as fresh feed. However, during the final portions of the run (i.e., from hour 1110 to hour 1750) these bottoms were recycled to the catalyst, thus converting all portions of the feed to synthetic product boiling below 360° F.

D. *Working up of product from run.*—In working up the effluent from the catalyst during the run, the first step comprised passing the product stream to a high pressure gas-liquid separator from which was recovered a hydrogen-rich recycle stream which was returned to the catalyst along with approximately 800 s.c.f. fresh, make-up hydrogen per barrel of feed. The remaining product stream was then passed at reduced pressures to a fractionator for separation into a synthetic product portion boiling below 360° F. and a bottoms portion. The 360° F.− synthetic portion so recovered was then sent to a debutanizer column for separation into a $C_4^-$ gas stream and a $C_5$ to 360° F. liquid product stream. The composition of the $C_4^-$ stream was determined by mass spectral analysis, while the $C_5$–360° F. product portion was broken up into a $C_5$–180° F. fraction and a 180–360° F. fraction for appropriate analysis. Representative product specifications based on an operating period at a catalyst temperature of 675° F. (which would represent a mid-run temperature of a typical commercial operation) are as follows:

TABLE V.—YIELDS FOR EXTINCTION RECYCLE OPERATION

[1,200 p.s.i.g., 6,500 s.c.f./b. gas recycle, 0.8 LHSV]

| | |
|---|---|
| Run No | 42–21 |
| Run Hours at Sample Period | 1,428–1,444 |
| Temperature, ° F | 675 |
| Per Pass Conversion, Vol. percent | 60 |
| $H_2$ Chemically Consumed, s.c.f./bbl. of Feed Converted to Synthetic Product | 1,280 |

| Yields | Weight percent | Volume percent |
|---|---|---|
| $C_1$ | 0.01 | |
| $C_2$ | 0.74 | |
| $C_3$ | 3.96 | |
| i-$C_4$ | 9.10 | |
| n-$C_4$ | 4.21 | |
| i-$C_5$ | 9.15 | |
| n-$C_5$ | 0.87 | |
| $C_5$–180° F | 20.5 | 26.0 |
| 180–360° F | 63.6 | 67.1 |
| $C_5$–360° F | 84.1 | 93.1 |

| Liquid Product Fraction | $C_5$–360° F. | $C_5$–180° F. | 180–360° F. |
|---|---|---|---|
| Gravity, ° API | 54.7 | 81.2 | 45.9 |
| Aniline Point, ° F | 89.5 | | 68 |
| Paraffins, Vol. percent | 72 | | 23 |
| Naphthenes, Vol. percent | 72 | | 39 |
| Aromatics, Vol. percent | 28 | | 38 |
| F-1 Octane No. (+3 ml. TEL) | 95.5 | | |

RESULTS COMPARED WITH RESULTS USING NON-THERMACTIVATED CATALYST

Based on information obtained in operations of a generally similar character, it is concluded that had the above run been repeated using the same catalyst, but omitting the step of thermactivating said catalyst at temperatures above 1,000° F., which catalyst would have had an activity index of about 14.0, the 60% per pass conversion level would have been reached not at 596° F. but only at about 641° F. Further, a temperature of 700° F. would have been reached after a period of about 370 hours and one of 750° F. at 930 hours.

REGENERATION OF CATALYST

While in the preceding sections it is noted that the catalyst of this invention is capable of remaining on stream at high conversion levels for long periods of time, the catalyst is capable of being regenerated in the conventional manner by burning impurities therefrom in an air or other oxygen-containing gas stream. However, the resulting oxide-containing catalyst should then be re-thermactivated by the method of this invention before being returned to service. When the catalyst is being used in the sulfided form, the nickel and/or cobalt oxides present in the now reactivated catalyst should again be converted to the sulfide form as the catalyst is again placed on stream.

The following example describes a preparation of a catalyst having an even higher activity index than that employed in the run of Example 1.

Example 2

A. *Preparation of support.*—Ten liters of a synthetic silica (90%)-alumina (10%) bead-form cracking catalyst were impregnated at room temperatures with 8 liters of an aqueous solution containing 2869 gms. Ni($NO_3$)$_2$·6$H_2O$. Following the impregnation step, the beads were drained of excess liquid and dried for ten hours at 250° F. Said beads had been prepared by admixing catalyst fines (having a size of 7 microns or below and obtained by abrading the finished, bead-form catalyst) with an aqueous 20% solution of sodium silicate, said fines being added in an amount equivalent to 20% based on the weight of the finished catalyst. This fines-containing solution was then admixed with an aqueous 30% solution of aluminum sulfate and the resulting mixture passed through an oil base at 45° F. to form bead-shaped globules containing 90% water. The latter were then base-exchanged using ammonium chloride solution, and after washing with hot water, were dried in a continuous moving belt oven at 350° F. in the presence of added steam. Said beads, in the finally dried condition, have a diameter of approximately ⅛" and a surface area of approximately 475 M²/g.

B. *Thermactivation, reduction and sulfiding.*—Thermactivation of the nickel nitrate-containing, dried beads prepared as above was then effected by taking a 500 cc. sample thereof and placing the same in a tube having an internal diameter of approximately 2", thus giving a catalyst bed depth of approximately 8". Air containing less than 1 p.p.m. water was passed over the catalyst at a rate equivalent to about 700 cu. ft./cu. ft. of catalyst for a period of four hours as catalyst temperatures were raised from room temperature to 1400° F., and thereafter at the same rate for an additional two-hour period at 1400° F. This catalyst, when thereafter reduced and sulfided in the manner described above in Example 1, is found to have an activity index of about 30.3.

OTHER CATALYST SYSTEMS IN WHICH CATALYST IS OPERABLE

While a hydrocarbon conversion process employing the catalyst of the invention has been described above in connection with fixed catalyst bed operation, such a process may also be carried out using a moving catalyst bed, a fluid catalyst system, or a slurry system, if the catalyst is suitably sized. These general procedures are now well established in the art, and no detailed descriptions will therefore be given for them.

Various minor changes and modifications in the method of preparing the catalyst of this invention can be made without departing from the spirit of said method, and the invention is therefore to be taken only as limited by the scope of the appended claims.

I claim:
1. A method for increasing hydrocracking activity of a composite catalyst comprising an active siliceous cracking component containing from about 40 to 99% by weight of silica, together with at least one hydrogenating component selected from the group consisting of nickel, nickel oxide, heat decomposable nickel salts, cobalt, cobalt oxide, and heat decomposable cobalt salts, said catalyst having a nickel content, calculated as Ni, of 0.5 to 25% by weight when nickel oxide is present and a cobalt content, calculated as Co, of from 3 to 25% by weight when cobalt oxide is present, said method comprising heating the catalyst, with said hydrogenating component present in the oxide form, by passing thereover a stream of a non-reducing gas having a water vapor partial pressure of less than 0.5 p.s.i.a., said gas being passed over the catalyst at a temperature of from about 1500 to 1600° F. and at a VHSV of at least 10 for a period of from about 0.25 to 2 hours.

2. The method of claim 1 wherein there is added the step of reducing the metal oxide hydrogenating component of the catalyst at the conclusion of the catalyst heating treatment.

3. The method of claim 1 wherein there is added the step of at least partially converting the metal oxide hydrogenating component of the catalyst to the corresponding sulfide at the conclusion of the catalyst heating treatment.

4. The method of claim 1 wherein the heated gas is passed over the catalyst for a period of time sufficient to provide an increase of at least 4 numbers in the 610° F. activity index of the catalyst.

5. A method for increasing the hydrocracking activity of a composite catalyst comprising an active siliceous cracking component made up of synthetically prepared silica-alumina containing from 70 to 99% by weight silica, together with a hydrogenating component made up of nickel oxide, said catalyst containing from 0.5 to 25% by weight nickel, said method comprising heating the catalyst by passing thereover a stream of a non-reducing gas having a water vapor partial pressure of less than 0.5 p.s.i.a., said gas steam being passed over the catalyst at a temperature of from about 1500 to 1600° F. and at a VHSV of at least 10 for a period of from about 0.25 to 2 hours.

6. The method of claim 5 wherein the heated gas is passed over the catalyst for a period of time sufficient to provide an increase of at least 4 numbers in the 610° F. activity index of the catalyst.

7. The process of claim 5 wherein there is added the step of reducing the nickel oxide present on the catalyst at the conclusion of the catalyst heating treatment.

8. The method of claim 5 wherein there is added the step of at least partially converting the nickel oxide present on the catalyst to nickel sulfide at the conclusion of the catalyst heating treatment.

9. A method for increasing the hydrocracking activity of a composite catalyst comprising an active siliceous cracking component made up of a synthetically prepared silica-alumina containing from 70 to 99% by weight silica, together with a hydrogenating component made up of cobalt oxide, said catalyst containing from 3 to 25% by weight cobalt, said method comprising heating the catalyst by passing thereover a stream of a non-reducing gas having a water vapor partial pressure of less than 0.5 p.s.i.a., said gas stream being passed over the catalyst at a temperature of from about 1500 to 1600° F. and at a VHSV of at least 10 for a period of from about 0.25 to 2 hours.

10. The method of claim 9 wherein the heated gas is passed over the catalyst for a period of time sufficient to provide an increase of at least 4 numbers in the 610° F. activity index of the catalyst.

11. The process of claim 9 wherein there is added the step of reducing the cobalt oxide present on the catalyst at the conclusion of the catalyst heating treatment.

12. The method of claim 9 wherein there is added the step of at least partially converting the cobalt oxide present on the catalyst to cobalt sulfied at the conclusion of the catalyst heating treatment.

13. A hydrocracking catalyst comprising an active siliceous cracking component containing about 40 to 99% by weight of silica, together with at least one hydrogenating component selected from the group consisting of cobalt, nicket and the oxides and sulfides of said metals, said catalyst containing from 0.5 to 25% by weight nickel when a nickel-containing material is employed as a hydrogenating component, and from about 3 to 25% by weight cobalt when a cobalt-containing material is so employed, said catalyst having a high 610° F. activity index as developed therein by heating the catalyst, with the metal of the hydrogenating component being present in the oxide form, at temperatures of from 1500° to 1600° F. in a stream of dry, non-reducing gas for a period of from about 0.25 to 2 hours, followed by reducing the oxide, in the case of the metal form of the catalyst, and by sulfiding, in the case of the sulfided form of the catalyst.

14. The catalyst of claim 13, wherein said hydrogenating component is nickel sulfide.

15. The catalyst of claim 13, wherein said hydrogenating component is cobalt sulfide.

16. A method for increasing the hydrocracking activity of a hydrocracking catalyst comprised of at least one hydrogenating component selected from the group consisting of nickel, nickel oxide, heat decomposable nickel salts, cobalt, cobalt oxide and heat decomposable cobalt salts, together with an active siliceous cracking component, containing about 40 to 99% by weight of silica, which comprises heating the catalyst, with said hydrogenating component present in the oxide form, to a temperature in the range of about 1200° to 1600° F. by contact with a dry, non-reducing gas, and holding the heated catalyst at such temperature for a time varying inversely with the temperature and in the range of from about 0.25 to 48 hours, and sulfiding the hydrogenating component of the catalyst at a temperature below about 750° F.

17. A method for increasing the hydrocracking activity of a composite catalyst comprising an active siliceous cracking component containing from about 40 to 99% by weight of silica, together with at least one hydrogenating component selected from the group consisting of nickel, nickel oxide, heat decomposable nickel salts, cobalt, cobalt oxide, and the heat decomposable cobalt salts, said catalyst having a nickel content, calculated as Ni, of 0.5 to 25% by weight when nickel oxide is present and a cobalt content, calculated as Co, of from 3 to 25% by weight when cobalt oxide is present, said method comprising heating the catalyst, with said hydrogenating component present in the oxide form, by passing thereover a stream of a dry, non-reducing gas at a temperature of from about 1200 to 1600° F. for a period of from about 0.25 to 48 hours, the low temperature being used generally with the longer times and vice versa, and at least partially converting the hydrogenating component of the catalyst to the corresponding sulfide at the conclusion of the catalyst heating treatment.

18. A catalyst comprising an active siliceous cracking component containing from about 40 to 99% by weight of silica, together with at least one hydrogenating component selected from the group consisting of cobalt sulfide and nickel sulfide, said catalyst containing from 0.5 to 25% by weight nickel when a nickel-containing material is employed as a hydrogenating component, and from about 3 to 25% by weight cobalt when a cobalt-containing material is so employed, said catalyst having a 610° F. activity index of at least 18 as developed therein by heating the catalyst, with the metal of the hydrogenating component being present in the oxide form, at a temperature of from 1200 to 1600° F. in a stream of a dry, non-reducing gas, for a period of from about 0.25 to 48 hours, the lower temperatures having been used generally with the longer times and vice versa, followed by at least partially converting the hydrogenating component of the catalyst to the corresponding sulfide at the conclusion of the catalyst heating treatment.

19. A method for increasing the hydrocracking activity of a fouled hydrocracking catalyst comprising an active siliceous cracking component containing from about 40 to 99% by weight of silica, together with at least one hydrogenating component selected from the group consisting of nickel, nickel oxide, heat decomposable nickel salts, cobalt, cobalt oxide, and heat decomposable cobalt salts, which comprises subjecting said catalyst to a regeneration treatment to remove carbonaceous deposits therefrom, and heating said catalyst following said regeneration at a temperature in the range of about 1200° to 1600° F. by contact with a dry, nonreducing gas for about 0.25 to 48 hours and at least partially converting the hydrogenating component of the catalyst to the corresponding sulfide.

20. A method for increasing the hydrocracking activity of a composite catalyst comprising an active siliceous cracking component containing from about 40 to 99% by weight of silica, together with at least one hydrogenating component selected from the group consisting of nickel, nickel oxide, heat decomposable nickel salts, cobalt, cobalt oxide, and heat decomposable cobalt salts, said catalyst having a nickel content, calculated as Ni, of 0.5 to 25% by weight when nickel oxide is present and a cobalt content, calculated as Co, of from 3 to 25% by weight when cobalt oxide is present, said method comprising heating the catalyst, with said hydrogenating component present in the oxide form, by passing thereover a stream of a nonreducing gas having a water vapor partial pressure of less than 0.5 p.s.i.a., said gas being passed over the catalyst at a temperature of from about 1200° to 1300° F. and at a VHSV of at least 10 for a period of from about 20 to 48 hours.

21. A hydrocracking catalyst comprising an active siliceous cracking component containing from about 40 to 99% by weight of silica, together with at least one hydrogenating component selected from the group consisting of cobalt, nickel and the oxides and sulfides of said metals, said catalyst containing from 0.5 to 25% by weight nickel when a nickel-containing material is employed as a hydrogenating component, and from about 3 to 25% by weight cobalt when a cobalt-containing material is so employed, said catalyst having a high 610° F. activity index as developed therein by heating the catalyst, with the metal of the hydrogenating component being present in the oxide form, at temperatures of from 1200° to 1300° F. in a stream of dry, nonreducing gas, for a period of from about 20 to 48 hours, followed by reducing the oxide, in the case of the metal form of the catalyst, and by sulfiding, in the case of the sulfided form of the catalyst.

References Cited

UNITED STATES PATENTS

| | | | |
|---|---|---|---|
| 2,452,190 | 10/1948 | Hetzel et al. | 252—455 |
| 2,497,176 | 2/1950 | Mason | 252—439 |
| 2,581,228 | 1/1952 | Bailey et al. | 252—455 |
| 2,606,940 | 8/1952 | Bailey et al. | 252—455 |
| 2,728,754 | 10/1955 | Evering et al. | 252—416 X |
| 2,753,310 | 7/1956 | Riedl | 252—439 |
| 2,780,584 | 2/1957 | Doumani | 252—439 X |
| 2,949,429 | 8/1960 | Bailey et al. | 252—455 |

OSCAR R. VERTIZ, *Primary Examiner.*

JULIUS GREENWALD, MAURICE A. BRINDISI,
*Examiners.*

W. S. BROWN, R. D. LOVERING, M. WEISSMAN,
*Assistant Examiners.*